(12) United States Patent
Trotter

(10) Patent No.: US 7,827,538 B2
(45) Date of Patent: Nov. 2, 2010

(54) MEMORY LEAK DETECTION

(75) Inventor: Martin J Trotter, Ampfield (GB)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 11/458,709

(22) Filed: Jul. 20, 2006

(65) Prior Publication Data

US 2007/0027942 A1    Feb. 1, 2007

(30) Foreign Application Priority Data

Jul. 27, 2005    (GB)    ................. 0515405.9

(51) Int. Cl.
*G06F 9/44* (2006.01)
*G06F 9/45* (2006.01)
(52) U.S. Cl. .................. 717/127; 717/128; 717/131; 717/151
(58) Field of Classification Search .................. 717/128
See application file for complete search history.

(56) References Cited

U.S. PATENT DOCUMENTS

| | | | | |
|---|---|---|---|---|
| 6,125,434 A | * | 9/2000 | Willard et al. ............... | 711/170 |
| 6,167,535 A | * | 12/2000 | Foote et al. .................... | 714/38 |
| 6,523,141 B1 | | 2/2003 | Cantrill ........................ | 714/48 |
| 6,658,600 B1 | * | 12/2003 | Hogdal et al. ................. | 714/33 |
| 6,658,652 B1 | * | 12/2003 | Alexander et al. ........... | 717/128 |
| 7,234,080 B2 | * | 6/2007 | Cirne et al. .................... | 714/38 |
| 7,257,692 B2 | * | 8/2007 | Schumacher ................. | 711/170 |
| 7,313,661 B1 | * | 12/2007 | Dmitriev ...................... | 711/159 |
| 7,325,106 B1 | * | 1/2008 | Dmitriev et al. ............. | 711/159 |
| 7,434,206 B2 | * | 10/2008 | Seidman et al. .............. | 717/124 |
| 7,496,615 B2 | * | 2/2009 | Broussard .................... | 707/206 |
| 7,577,943 B2 | * | 8/2009 | Chilimbi et al. ............. | 717/130 |
| 2006/0095427 A1 | * | 5/2006 | Dickenson ...................... | 707/6 |

* cited by examiner

*Primary Examiner*—Thomas K Pham
(74) *Attorney, Agent, or Firm*—David A. Mims; Robert C. Rolnik

(57) ABSTRACT

A memory leak detection scheme for use in a computer system (e.g., Java) by: finding an allocation site (410) which is responsible for allocating objects which accumulate in a memory heap (400); and monitoring memory activity related to the found allocation site to discover a memory leak related thereto. The technique can be entirely application independent and can be made fully automatic, running as a daemon process on a machine and detecting leakage in a number of client processes simultaneously.

14 Claims, 4 Drawing Sheets

MEMORY LEAK DETECTION

FOREIGN APPLICATION PRIORITY DATA

This application claims benefit of priority of Foreign Patent Application No. GB 0515405.9, filed in the United Kingdom on Jul. 27, 2005, which is incorporated herein by reference.

FIELD OF THE INVENTION

This invention relates to memory leak detection in computer software, and particularly (though not exclusively) to memory leak detection in Java software.

BACKGROUND OF THE INVENTION

In the field of this invention it is known that, in computer software, whenever objects are created under user control there is a chance that they will not be destroyed again. In languages such as C and C++ both the creation and deletion of objects are directly under user control and the result was that many large projects found cases where memory would be consumed but not returned. Often these 'memory leakage' problems were too difficult to locate and correct and the result would be that the programs would fail periodically. Over the years there have been many attempts to remove these problems from the user domain and 'garbage collected' languages such as Smalltalk and Java have become popular. In these languages the user no longer controls the deletion of objects, rather they are automatically reclaimed when no longer referenced by the program. Hence the traditional 'memory leakage' might be considered a thing of the past. Despite this people can still be heard discussing memory leakage in Java programs. The name is the same but the cause is now completely different: now, rather than forgetting to delete the object, the programmer has added it to a collection and forgotten to—remove it or provide any mechanism to otherwise cleanup the collection. There are various potential mechanisms provided by Java such as 'Soft' and 'Weak' references and various collections built upon them which can be used to solve these possibilities, but they tend to be used by a minority of programmers. The net result is that Java programs run out of memory and it is often hard to determine the precise cause. There have been many attempts to provide tools which help diagnose the source of the 'leakage'. Generally they rely on comparing snapshots of the heap over time. By examining the difference between two snapshots it is often possible to determine which structures 55 e.g., lists or other collections) are growing and this can give a guide to the solution.

From US patent publication no. 2004/0078540A1 there is known a technique for detecting leaks by concentrating on monitoring the sizes of collections. The allocation of a collection is tracked and then subsequently its size is monitored, and collections which are growing are reported. Although the technique can aid in reducing memory leakage, it requires collections to be recognised and so it is not appropriate for automatic leak detection.

From U.S. Pat. No. 6,523,141 there is known a technique for locating memory leakage in non-Java code, typically Operating System kernel code. From a crash dump it attempts to locate pieces of memory which have been allocated but are no longer referenced. By implication these pieces of memory should have been freed and the fact that they have not been freed means that there has been a memory leak. If we can work out where those pieces of memory were allocated, then the leaks can be fixed. The answer is to keep the allocation site information for every allocated object. If one of them is later found to have leaked, it can be determined immediately where it was allocated. However, this technique is not applicable to Java since Java's garbage collector finds and reuses all unreferenced memory.

A need therefore exists for memory leak detection in software such as Java wherein the above mentioned disadvantage(s) may be alleviated.

STATEMENT OF INVENTION

In accordance with a first aspect of the present invention there is provided a system for memory leak detection in a computer system, comprising: means for finding an allocation site which is responsible for allocating objects which accumulate in a memory heap; and means for monitoring memory activity related to the found allocation site to discover a memory leak related thereto.

In accordance with a second aspect of the present invention there is provided a method for memory leak detection in a computer system, comprising: finding an allocation site which is responsible for allocating objects which accumulate in a memory heap; and monitoring memory activity related to the found allocation site to discover a memory leak related thereto.

In accordance with a further aspect of the present invention there is provided a computer program element stored on a data carrier and comprising computer program means for instructing the computer to perform a method for memory leak detection in a computer system, said method comprising: finding an allocation site which is responsible for allocating objects which accumulate in a memory heap; and monitoring memory activity related to the found allocation site to discover a memory leak related thereto.

BRIEF DESCRIPTION OF THE DRAWINGS

One system and method for memory leak detection in Java incorporating the present invention will now be described, by way of example only, with reference to the accompanying drawing(s), in which.

DESCRIPTION OF PREFERRED EMBODIMENT(S)

As referred to above, Java addresses the majority of memory leaks through garbage collecting unused objects using criteria such as that objects are unreferenced. However, memory leaks can still occur, such as through inadvertently leaving an unrequired Java object in a Java collection. Existing techniques to detect such leaks involve monitoring the growth of the heap and comparing snapshots of a growing heap to identify which structures (e.g., which collections) are growing. This still leaves the problem of knowing exactly where leaking objects are being allocated.

Briefly stated, and as will be explained in greater detail below, at least in its preferred embodiment the present invention is based on instead identifying the actual allocation points (known as allocation sites) of leaked objects. The allocation site is the stack trace at the point at which an object is allocated (i.e., this provides the exact sequence of method calls which resulted in the allocation of the object). This is readily obtainable using the standard JVM facility to monitor the allocation of all objects (such as JVMPI—Java Virtual Machine Profiling Interface). An agent software routine monitors the allocations at each allocation site during normal running of the application at predetermined monitoring intervals. The agent can then identify allocation sites of particular interest (i.e., active sites) and highlight these as potential sources of a memory leak.

Figure 1:
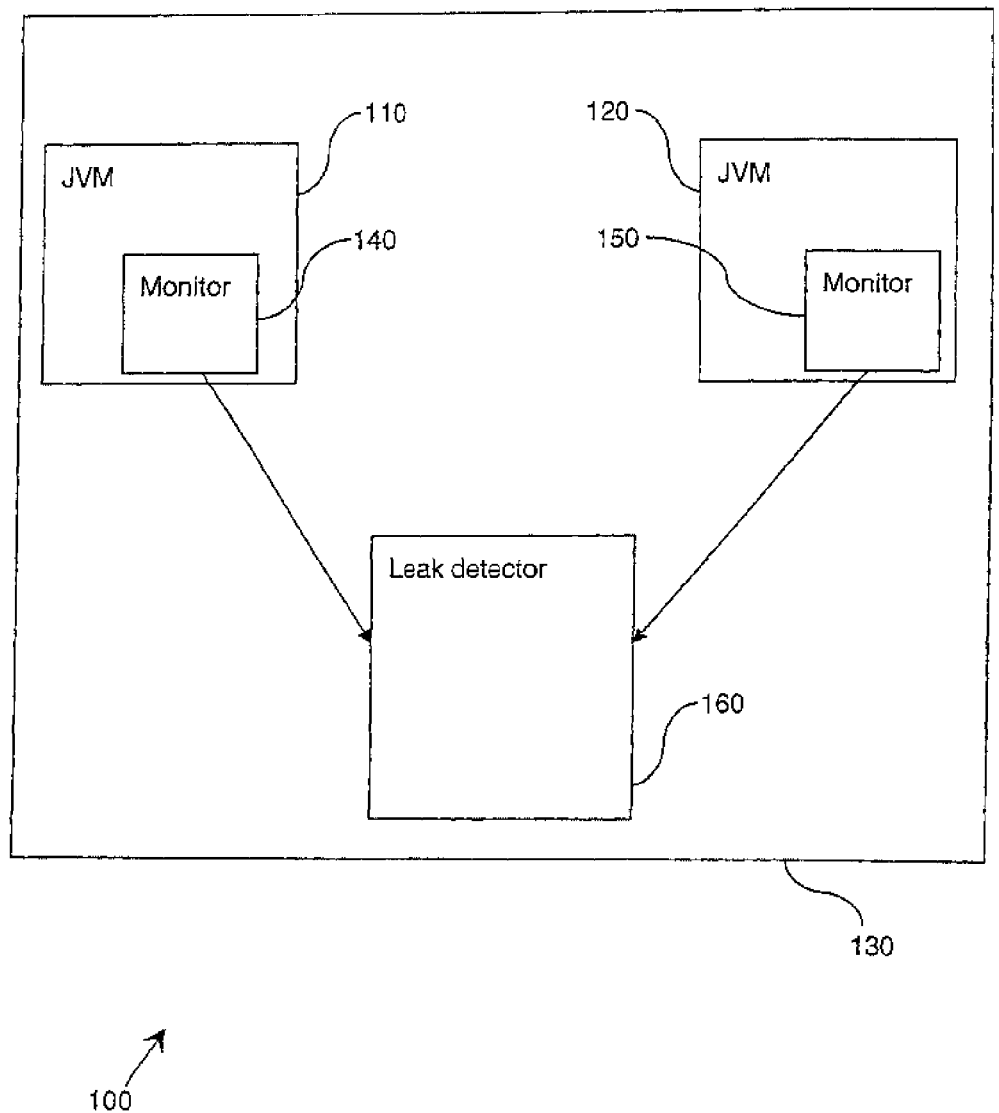
FIG. 1 shows a block schematic diagram illustrating two Java Virtual Machines (VMs) connecting to a leak detector running on a single machine.

Referring now to FIG. 1, in a computer system 100 the Java application which is "leaking memory" is running in a Java Virtual Machine (JVM) 110 or 120 on some particular operating system on a single computer or machine 130. We take advantage of the capability of the virtual machine to monitor the allocation of all objects. One approach is to employ JVMPI and subscribe to all object allocation events. When an object is allocated we can ask for the allocation context (the stack trace at the allocation point) and we refer to that as the "allocation site" of the object. Hence it is not just the method name and line number in the class file where the allocation occurred but also specifies the line numbers in the classes which called the method that did the allocation. The aim is to find the allocation site which is responsible for creating the objects which grow in number over time.

First we need to build a JVMPI agent which is able to monitor object allocations and keep track of the allocation sites and count the objects allocated by each site. The Profiling Interface (PI) agent communicates by some mechanism (e.g., a TCP/IP socket) with a separate monitoring process (monitor 140 or monitor 150) running on the JVM. The PI instigates the communications when the PI agent starts. The monitoring process initially just asks the PI agent to send periodic counts of the allocations happening at each site. The agent then sends the counts which have accumulated in the last period. The monitoring process watches the allocations and also watches the heap size as the JVM operates. Typically the heap size will increase during the 'startup' phase of the application and then reach some stable level. A "memory leak" can be seen as a, typically slow, growth in heap size following this startup phase. The monitoring process waits until it has identified the end of startup, and then examines the allocation site counts in each period. The period length is adjusted to ensure that reasonable numbers of allocations have occurred. The monitoring agent selects a subset of these active sites and asks the PI agent to monitor them in detail. The PI agent records the fact that a particular allocation site must be monitored in this way by setting a flag on the site. Subsequent allocations at that site are recorded in a 'surrogate heap' within the PI agent. This surrogate heap only keeps track of a subset of the objects that exist in the Java heap. In order to keep track, it records the object ID (as known by JVMPI) and the allocation site ID (a unique identifier for the site such as an integer). The PI agent monitors object move and free events and updates the surrogate heap accordingly. Move events imply a change of object ID, and free events cause removal of the ID from the surrogate heap (the ID may subsequently be reused for another object). Periodically the monitoring agent asks the PI agent to count the objects in the surrogate heap (and it responds by giving the counts of live objects for each allocation site). If the result shows that a particular site has a growing number of live objects associated with it (by monitoring over a number of periods) then we can suspect a memory leak. The longer we monitor the growth the more confident we can be of the diagnosis. If no site shows such growth the monitoring agent selects a new set of potential sites and the monitoring continues. It will be appreciated that the PI agent is a form of the monitor (140/150) that is implemented on top of JVMPI.

It will be understood that this scheme results in a leak detector which can be entirely application independent (e.g., it does not need to know what a 'collection' is) and can be running as a daemon process on a machine so that it simultaneously detects leakage in a number of client processes (this is illustrated by the two JVM monitors 140 and 150 joining to a single leak detector 160 running on the machine 130). It will further be understood that the leak detector could be on another machine, although the resulting communications overhead may impact the performance of the monitored JVM.

Figure 2:
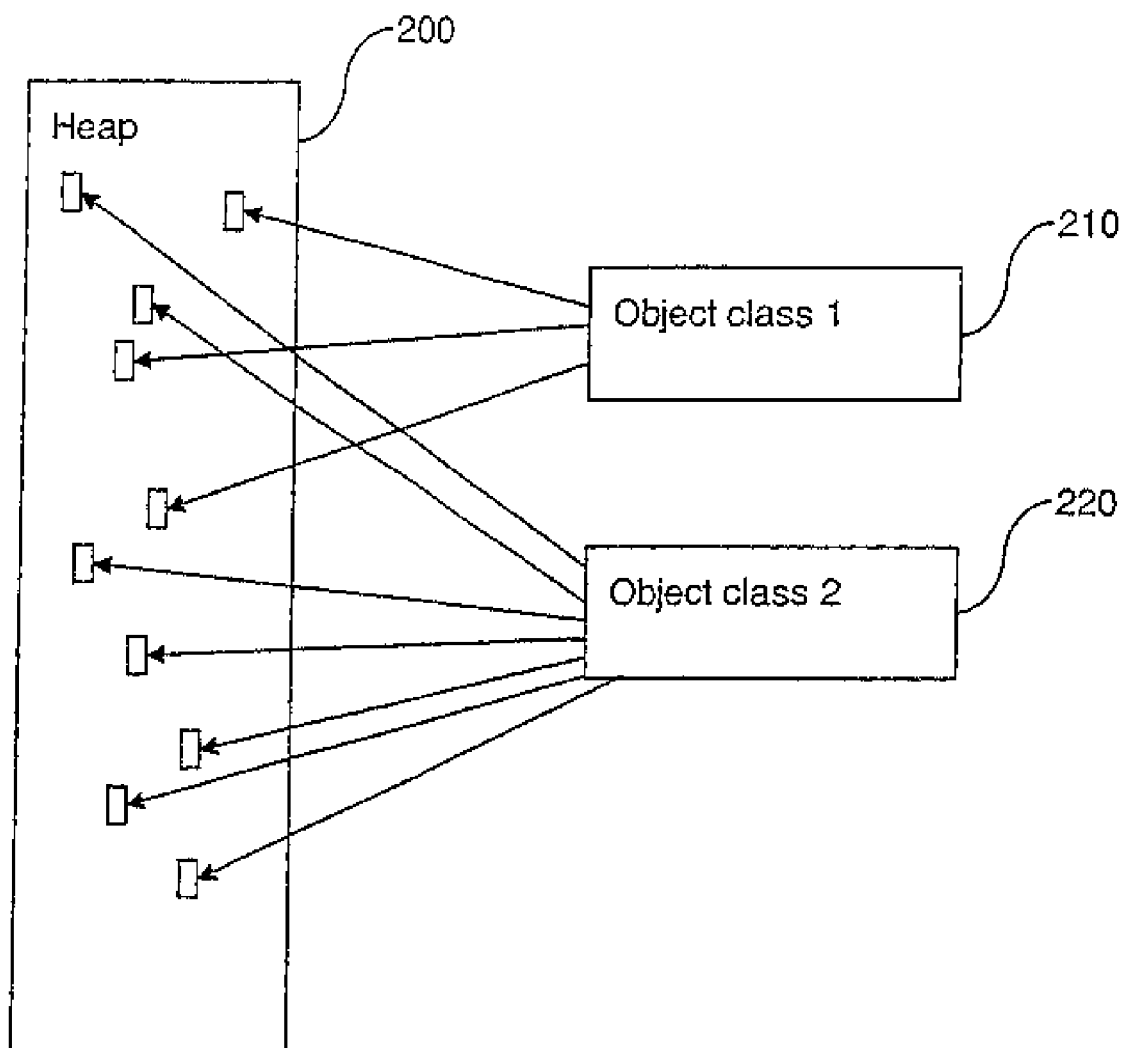
FIG. 2 shows a block schematic diagram illustrating a Java heap containing instances of two separate classes.

Considering the leak detector of the system of FIG. 1 in greater detail, FIG. 2 shows a Java memory heap 200 containing instances of two different object classes: object class 1 (210) and object class 2 (220). In this case it can be seen that there are more objects of class 2. If after some timer interval it is noticed that there are even more objects of class 2, then it can be concluded that there is probably a memory leak (since objects of class 2 are not being collected as fast as they are being created).

Figure 3:
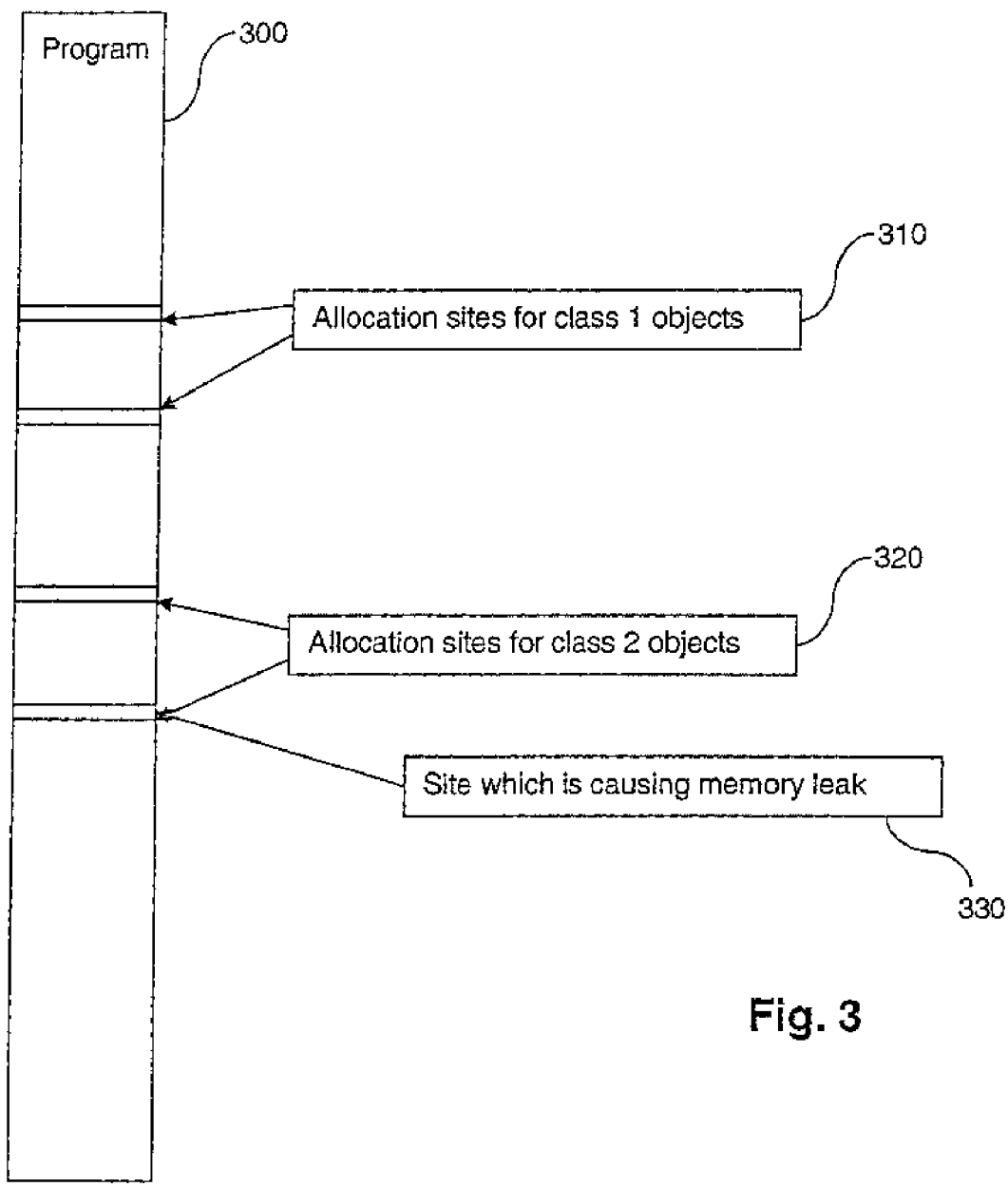
FIG. 3 shows a block schematic diagram illustrating a program having allocation sites for two different classes of objects.

FIG. 3 shows a program 300 in which there are two places where objects of class 1 are created (310) and two places where objects of class 2 are created (320). After the leak detector has monitored the situation for some time it concludes that one of those allocation sites (330) is responsible for the creation of the objects which are growing in the heap and therefore is the memory leak. It should be noted that for simplicity a single location is pointed at for an allocation site, but in reality an allocation site is a 'stack' of locations (as illustrated in FIG. 4).

Figure 4:
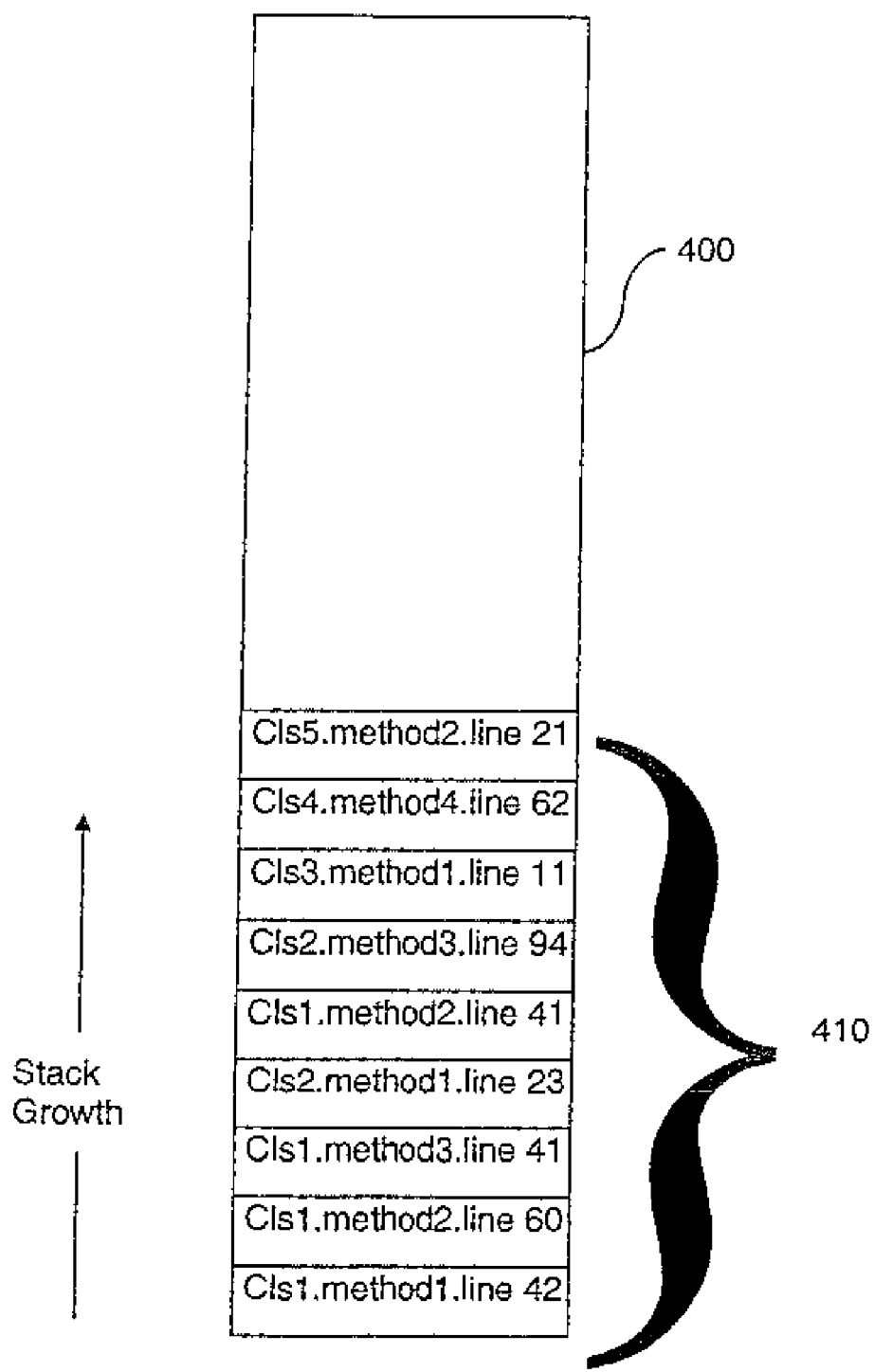
FIG. 4 shows a block schematic diagram illustrating the contents of a program stack related to a single thread at a point in a program where it allocates an object.

FIG. 4 illustrates the state of a single program thread 400 at the point at which it allocates an object, and shows a stack of locations (410) which is referred to as an allocation site. It is possible to discover this information in the monitoring agent at the point that an object is allocated. The agent will typically keep a list of such allocation sites that are to be monitored and hence, when an object is allocated, the agent can look at its list of sites to be monitored and at the class of object that is being allocated. It can then decide if it should keep track of this particular allocated object.

It will be understood that various optimizations to the above scheme are possible. The monitoring agent need only start detailed monitoring if the heap size is growing. If there is no heap growth then we can be confident that there is no leakage. It is important to have a good strategy for selecting the sites to monitor. One possibility would be to monitor a single site at a time but of course this would lead to a very long cycle time to identify a leak. In the worst case the JVM may have failed (with an out-of-memory error) before the leak is identified. Monitoring all the allocation sites would lead to a very large surrogate heap and poor performance. Hence we need to monitor as many sites as possible but limit the size of the resulting surrogate heap. Once a set of such sites is found to be leaking we can simply do a 'binary chop' (a well-known technique for finding the position of a value in a sorted array of values) to discover the precise leaking site (or sites).

It will be appreciated that although the above example employs JVMPI, the present invention does not rely on JVMPI. An alternative implementation may employ JVMTI (Java Virtual Machine Tool Interface) or another suitable JVM interface. A monitor based on—JVMTI would employ byte code modification. In this alternative implementation, any classfile which allocates objects is modified to insert allocation tracking code which performs the same function as monitoring the object allocation event in JVMPI. A disadvantage of this alternative implementation is that widespread classfile modification is necessary, but the advantage is that the monitoring code can now be written in Java; JVMPI implies that the monitoring code be written in C.

Further, it will be understood that although the preferred embodiment of the invention has been described above in the context of Java, to which the present invention is particularly suited, the invention is not limited to use in a Java environment and may be used in any similar software environment (e.g., Smalltalk) where unreferenced memory is found and reused.

In conclusion, it will be understood that the above-described novel memory leak detection scheme is based on an alternative mechanism to prior art schemes. Rather than look for structures which grow, the above-described novel memory leak detection scheme attempts to find the allocation site which is responsible for allocating the objects which are accumulating in the heap. This allows the programmer to focus directly on the lifecycle of the objects that are causing the problem. By using a debugger it will be possible to set a breakpoint at the leaking allocation site and then watch the object subsequently being added to some collection (it will be appreciated that this technique identifies the point of the leak but does not identify why the leak is happening, and to find this out a programmer would either have to read the code or as suggested set a debugger breakpoint and step through the code looking for the point at which the object is added to some collection). The result is a leak detector which can be entirely application independent and can be made fully automatic, running as a daemon process on a machine and detecting leakage in a number of client processes simultaneously.

The invention claimed is:

1. A memory leak detection system for memory leak detection in a computer system, comprising:
   computer means for starting a computer system running a Java interface;
   computer means for finding an allocation site wherein the allocation site is responsible for allocating objects which accumulate in a memory heap to form a found allocation site, responsive to computer means for starting the computer system running a Java interface; and
   computer means for monitoring memory activity related to the found allocation site to discover a memory leak related thereto by detecting growth in heap size, responsive to starting the computer system running the Java interface, wherein the computer means for monitoring memory activity comprises computer means for detecting a growth in heap size following a start-up phase, and wherein the computer means for detecting a growth in heap size following a start-up phase comprises computer means for detecting a growth in size of a surrogate heap tracking a subset of objects existing in another heap, wherein the surrogate heap is comprised of at least one object ID and at least one allocation site ID that uniquely identifies the allocation site by an integer, wherein the allocation site comprises a method name in a class file, at least one line number in the class file, and at least one class file that called the method name.

2. The memory leak detection system of claim 1 wherein the computer system comprises a Java environment.

3. The memory leak detection system of claim 2, wherein the Java interface is a Java Virtual Machine Profiling Interface.

4. The memory leak detection system of claim 2, wherein the Java interface is a Java Virtual Machine Tool Interface.

5. The memory leak detection system of claim 2, wherein the computer means for monitoring memory activity comprises computer means for inserting monitoring Java code in a classfile which allocates objects to track object allocation.

6. A computer implemented method for memory leak detection in a computer system, the computer implemented method comprising:
   starting the computer system running a Java interface;
   finding, by the computer system, an allocation site, wherein the allocation site is responsible for allocating objects which accumulate in a memory heap to form a found allocation site, responsive to starting the computer system running a Java interface; and
   monitoring memory activity related to the found allocation site, by the computer system, to discover a memory leak related thereto by detecting growth in heap size, responsive to starting the computer system running the Java interface, wherein detecting growth in heap size comprises detecting a growth in size of a surrogate heap tracking a subset of objects existing in another heap, wherein the surrogate heap is comprised of at least one object ID and at least one allocation site ID that uniquely identifies the allocation site by an integer, wherein the allocation site comprises a method name in a class file, at least one line number in the class file, and at least one class file that called the method name.

7. The computer implemented method for memory leak detection of claim 6, wherein monitoring memory activity comprises
   setting a debugger breakpoint at the found allocation site;
   identifying a point of the memory leak; and
   adding the object of the allocation site to a collection.

8. The computer implemented method for memory leak detection of claim 6, wherein the step of finding an allocation site comprises finding a subset of a set of found allocation sites, and the step of monitoring memory activity comprises monitoring memory activity at the subset of found allocation sites.

9. The computer implemented method for memory leak detection of claim 6, wherein the computer system comprises a Java environment.

10. The computer implemented method for memory leak detection of claim 9, wherein the Java interface is a Java Virtual Machine Profiling Interface.

11. The computer implemented method for memory leak detection of claim 9, wherein the Java interface is a Java Virtual Machine Tool Interface.

12. The computer implemented method for memory leak detection of claim 9, wherein monitoring memory activity comprises inserting monitoring Java code in a classfile, which allocates objects to track object allocation.

13. A computer implemented method for memory leak detection in a computer system, the computer implemented method comprising:
   starting the computer system running a Java interface;
   finding an allocation site wherein the allocation site is responsible for allocating objects which accumulate in a memory heap to form a found allocation site, responsive to starting the computer system running a Java interface; and
   monitoring memory activity related to the found allocation site to discover a memory leak related thereto, wherein the computer means for monitoring memory activity comprises computer means for detecting a growth in heap size following a start-up phase, and wherein the computer means for detecting a growth in heap size following a start-up phase comprises computer means for detecting a growth in size of a surrogate heap tracking a subset of objects existing in another heap, wherein the surrogate heap is comprised of at least one object ID and at least one allocation site ID that uniquely identifies the allocation site by an integer, wherein the allocation site comprises a method name in a class file, at least one line number in the class file, and at least one class file that called the method name monitoring further comprises: setting a debugger breakpoint at the found allocation site and monitoring an object related thereto subsequently being added to a collection.

14. The computer implemented method for memory leak detection of claim 13, wherein finding an allocation site comprises finding a subset of a set of found allocation sites, and wherein monitoring memory activity comprises monitoring memory activity at the subset of found allocation sites.

* * * * *